US006746022B2

(12) United States Patent

Cheung et al.

(10) Patent No.: US 6,746,022 B2

(45) Date of Patent: Jun. 8, 2004

(54) CHUCK FOR HOLDING A WORKPIECE

(75) Inventors: Yiu Ming Cheung, Kwai Chung (CN); Ka Wing Wong, Kwai Chung (CN)

(73) Assignee: ASM Assembly Automation Ltd. (HK)

( * ) Notice: Subject to any disclaimer, the term of this patent is extended or adjusted under 35 U.S.C. 154(b) by 36 days.

(21) Appl. No.: 10/027,180

(22) Filed: Dec. 26, 2001

(65) Prior Publication Data

US 2003/0116152 A1 Jun. 26, 2003

(51) Int. Cl.[7] .................................................. B23Q 3/00

(52) U.S. Cl. .............................. 279/3; 269/21; 451/388

(58) Field of Search .............................. 279/3; 269/21; 451/388; 409/197, 225, 903, 132

(56) References Cited

U.S. PATENT DOCUMENTS 3,749,625 A * 7/1973 Berg .......................... 156/250
4,808,046 A * 2/1989 Pilkington et al. .......... 409/132
4,946,320 A * 8/1990 VanderMey ................. 409/132
5,803,797 A 9/1998 Piper
6,165,232 A * 12/2000 Tieber et al. ............... 451/388
6,250,990 B1 6/2001 Yoshii et al.

* cited by examiner

*Primary Examiner*—Daniel W. Howell

(74) *Attorney, Agent, or Firm*—Ostrolenk, Faber, Gerb & Soffen, LLP

(57) ABSTRACT

The invention provides a chuck for holding a workpiece, such as a chip-array semiconductor Chip Scale Packages (CSP) substrate, having a plurality of components such as CSPs to be singulated, and chaff areas of the components. The chuck comprises means to hold the chaff areas when the components are being singulated, that may include a first pressure means to hold the components and a second pressure means to hold the chaff areas.

11 Claims, 2 Drawing Sheets

CHUCK FOR HOLDING A WORKPIECE

FIELD OF THE INVENTION

The invention relates to a chuck for holding a workpiece comprising a plurality of components to be singulated Such a workpiece may be the molded strip of a clip-array semiconductor Chip Scale Packages (CSP) substrate, and each component may be a CSP.

BACKGROUND AND PRIOR ART

Conventionally, a number of CSPs are manufactured on a single strip of molded substrate comprising a plurality of such packages, and it is necessary to separate them into singulated packages before further processes to manufacture a CSP can be performed. When singulating the CSPs, for example, by using a dicing saw, it is usual to use a chuck to hold the molded substrate of CSPs in place during the cutting process.

One way of holding the CSP package is by the use of water frame and UV adhesive tape to hold the CSP substrate in place during the singulation, which binds all the individual packages to the adhesive surface during the cutting process. However, as the dicing blade will come into contact with the adhesive tape during cutting, some adhesive will bond to the blade and reduce its effectiveness. Another disadvantage of this process is that there may be adhesive still remaining on the package even after it is removed from the tape. It may become a source of contaminant for the rest of the manufacturing processes.

Another way is to use a chuck with a suction device, similar to that described in U.S. Pat. No. 5,803,797 for a "Method and Apparatus to Hold Integrated Circuit Chips onto a Chuck and to Simultaneously Remove Multiple Integrated Circuit Chips from a Cutting Chuck". In a fixture based singulation process employing a saw, chip-array electronic packages of a CSP substrate are cut to their individual dimensions and separated from one another on a vacuum chuck with an elastomeric surface. The edge scrap of the CSP substrate will be washed away from the cutting chuck by coolant and cleaning water generated in association with the dicing saw. The sawn CUP will be held onto the chuck until the cutting process is completed and ready to be unloaded to next handling process.

A variant using a similar method is U.S. Pat. No. 6,250, 990 for a "CSP Plate Cutting Apparatus". It describes an apparatus for cutting CSP substrates into individual CSPs to put them on carrier trays for transportation. The jig for holding the substrate has numerous suction ports to hold each CSP to be singulate, and also second vacuum line to hold the sawn CSP for subsequent handling as the chuck is removed from the vacuum table.

However, during the singulation process by dicing saws edge scraps or chaffs are released as they are cut and removed from the rest of the workpiece. There is a possibility that some scraps may fly off and hit the saw blade during the cutting process. This can premature blade breakage. The risk is more pronounced when gang saws or multiple-blade dicing methods are used for the cutting process. The prior art mentioned above does not address this problem of controlling edge scraps generated during the singulation process.

SUMMARY OF THE INVENTION

It is thus an objective of the invention to seek to provide a chuck that can obviate tho disadvantages of the prior art.

According to a first aspect of the invention, there is provided a chuck for holding a workpiece having a plurality of components to be singulated and chaff areas of the components, comprising means to hold the chaff areas when the components are being singulated.

According to a second aspect of the invention, there is provided; method of dicing a workpiece comprising a plurality of components held to a chuck, and removing chaff areas of the workpiece, including the steps of providing a first pressure means to hold each component of the workpiece to the chuck; providing a second pressure means to hold the chaff areas to the chuck; and dicing the workpiece to separate the plurality of components, and the chaff area.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

DETAILED DESCRIPTION OF THE PREFERRED EMBODIMENT OF THE INVENTION

Figure 1:
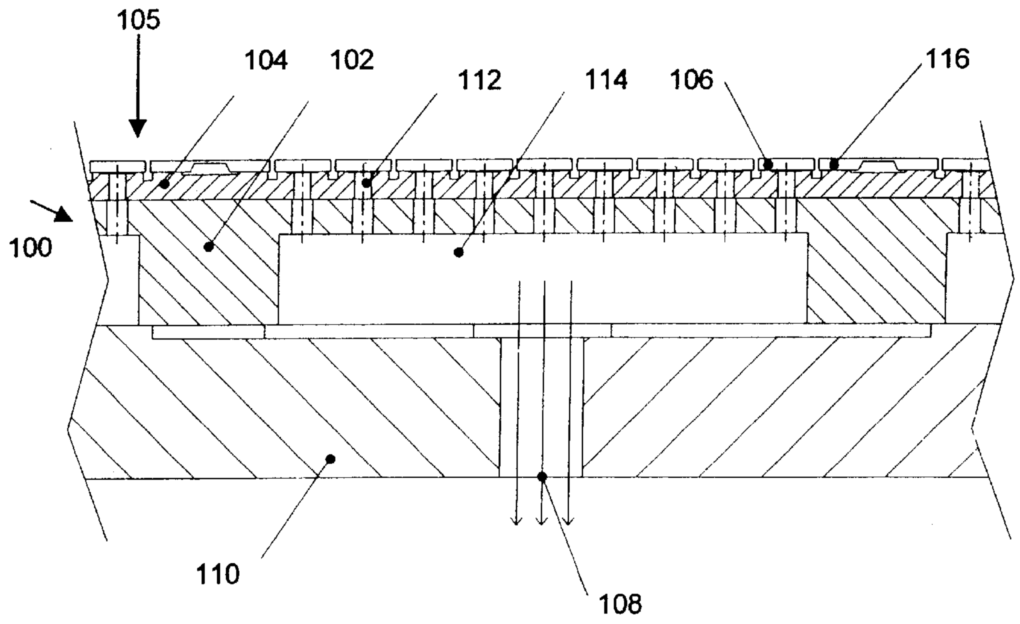
FIG. 1 (PRIOR ART)
FIG. 1 is a cross sectional side view of a cutting chuck of the prior art.

FIG. 1 is a cross-sectional side view of a cutting chuck of the prior art. The chuck 100 is comprised of a rigid base support 102 with an elastomeric top surface 104 to provide compliance for a workpiece such as a CSP substrate 105 to build up the vacuum required for the cutting process. During cutting, the sawn packages 106 are held on the chuck 100 by vacuum suction provided by a high-flow vacuum source 108 of a cutting table 110 via a plurality of suction ports 112 and vacuum chamber 114 of the chuck 100.

With the above arrangement chaff areas from a workpiece, which are also referred to as edge scraps 116, are not being restrained at all and will be washed away or allowed to fly off during the cutting process. There is thus a possibility that one or more of the released edge scraps will hit and break a cutting blade (not shown) during cutting. The risk is greater if multiple blades are used for the cutting and singulation.

Figure 2:
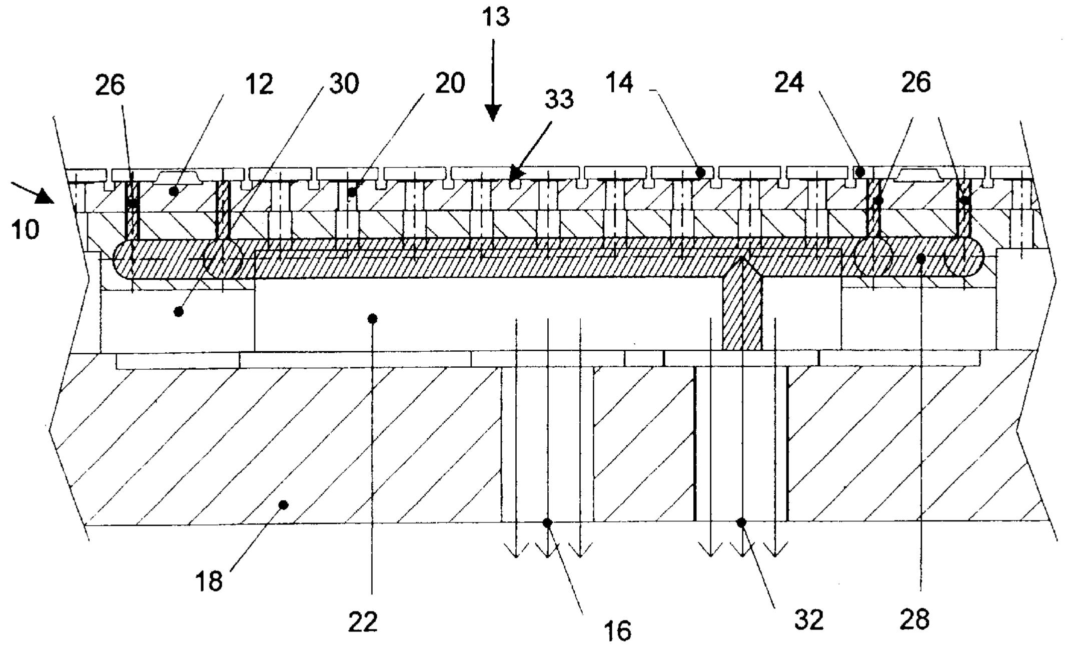
FIG. 2 is a cross-sectional side view of a cutting chuck according to a preferred embodiment of the invention.

FIG. 2 is a cross-sectional side view of a cutting chuck 10 according to the preferred embodiment of the invention. It comprises an elastomeric surface 12 to provide compliance for a workpiece 13, such as a CSP substrate, to build up the vacuum required for the cutting process. There is an array of recesses 33 that are formed on the elastomeric surface 12 to coincide with the cutting lines of a dicing saw (not shown). The workpiece 13 should be arranged directly on the elastomeric surface 12 of the chuck 10 in such an orientation that the lines formed by the recesses 33 correspond to the cutting lines of the workpiece and dicing saw to prevent damage to the elastomeric surface. During cutting, each component or sawn package 14 is held on the chuck 10 by a pressure means such as a vacuum source provided by a first high-flow vacuum chamber 22 of the chuck 10.

In the preferred embodiment, the chaff areas or edge scraps 24 are each also held by second suction ports 26 providing a suction force. This second suction force may be provided via the second suction ports 26 and vacuum manifold 28 adjacent the vacuum chamber 22. The vacuum manifold 28 leads to a second high-flow vacuum source 32. All the suction ports 20, 26 are in fluid communication with the respective vacuum chamber or manifold 22, 28 and vacuum sources 16, 32. The first vacuum source 16 and the second vacuum source 32 can be independently and separately controlled so that the pressure means relating to the first vacuum source 16 and second vacuum source 32 can be selectively activated or deactivated. Further, a vacuum passage 30 may be Included to connect one vacuum chamber 22 to an adjacent vacuum chamber in order for more than one set of first suction ports 20 to utilize the same first vacuum source 16. The second suction ports 26 are preferably arranged along or adjacent the peripheral edges of the workpieces 13 wherein the edge scraps 24 are located.

Figure 3:
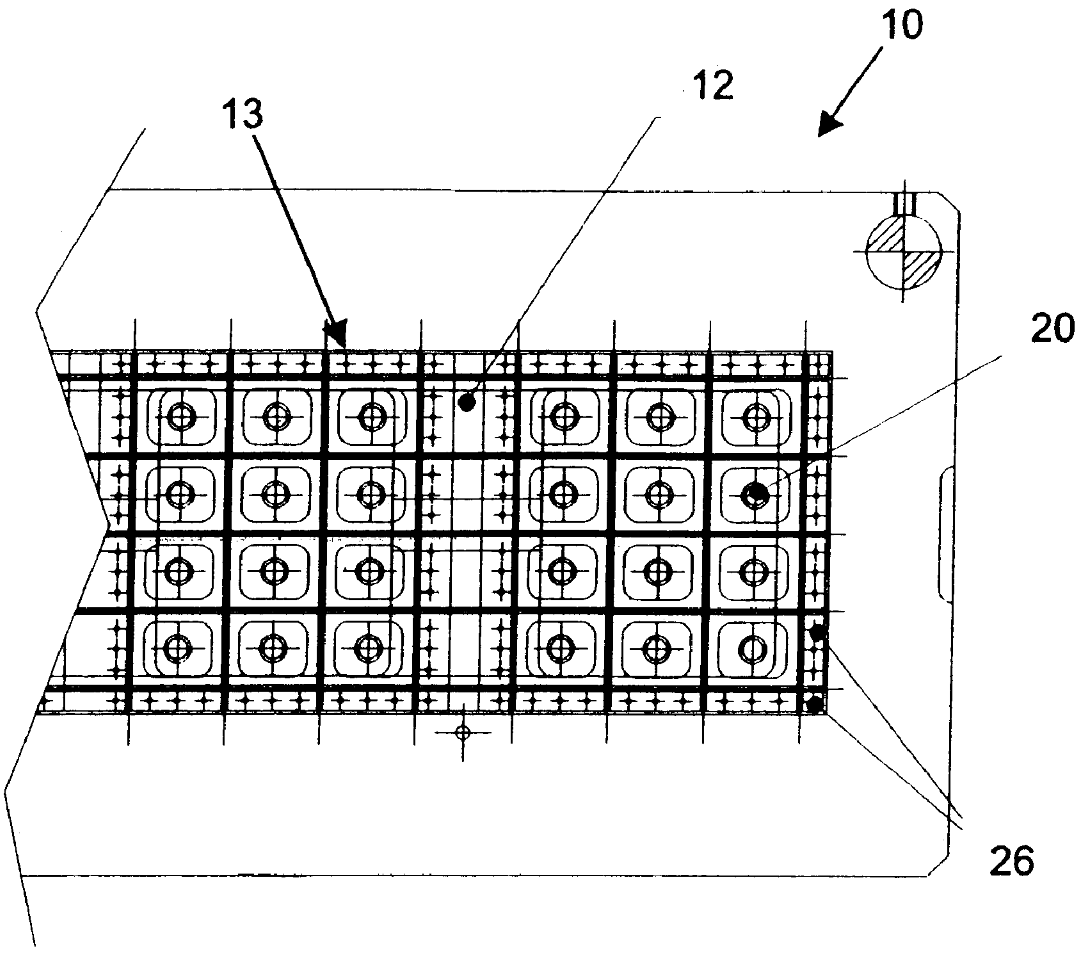
FIG. 3 is a plan view of the cutting chuck of FIG. 2 illustrating an arrangement of suction ports on the chuck.

FIG. 3 is a plan view of the cutting chuck 10 of FIG. 2 illustrating the arrangement of suction ports 20, 26 on the chuck 10 to singulate individual components packages 14 and separate chaff areas adjacent to the packages A plurality of first suction ports 20 are arranged in an array corresponding to the arrangement of packages 14 to be sawn from the workpiece 13. A plurality of second vacuum ports 26 are arranged around the perimeters of the plurality of first suction ports 20 to coincide with the position of the edge scraps 24 of a workpiece 13. It is preferable that there is a second suction port 26 adjacent to each package 14 that is being singulated so that each piece of edge scrap 24 is secured when the adjacent package 14 is cut.

The operational sequence of the dicing process using the cutting chuck 10 according to the preferred embodiment is as follows:

1. The workpiece 13 is first aligned on the cutting chuck by an alignment means (one that is known in the art will suffice) to ensure that the cutting lines or saw runs of the CSP substrate overlap with the recesses 33 of the chuck 10 which provide clearance for the blades during cutting.
2. The vacuum suction sources 16, 32 for the sawn packages 14 and edge scraps 24 are turned on such that the workpiece 13 is firmly held onto the cutting chuck. The cutting process is started.
3. During cutting, the edge scraps 24 and individual CSP 14 are separated from the base CSP substrate of the workpiece 13 but they are held firmly onto the chuck by the suction from the vacuum sources 16 and 32 through the suction ports 20 and 26, respectively,
4. At the end of the cutting process, all the sawn packages 14 and the edge scraps 24 are physically separated but are retained on the chuck 10 by the vacuum forces.
5. The vacuum control for the second vacuum source 32 linking to the second suction ports 26 which retain the edge scraps 24, is turned off. The vacuum control for the first vacuum source 16 is left on so that the sawn packages 14 are still held onto the chuck 10. All the edge scraps 24 are washed away by cleansing means, commonly cutting and cleaning water generated in association with the cutting process.
6. The vacuum control for the first vacuum source 16 is then turned off when the sawn packages 14 are to be unloaded to the next handling process.

It would thus be appreciated that the described embodiment provides an arrangement for vacuum suction on individual components 14 of workpieces 13 as well as their edge scraps 24. The individual components 14 are held onto the cutting chuck by pressure formed through the suction ports 20 which are arranged in the same layout as individual CSPs on the CSP substrate. The separated edge scraps 24 are retained on the cutting chuck 10 by an arrangement of suction ports 26 during the cutting process. At the end of the cutting process, the vacuum for holding the edge scraps 24 will be terminated and the edge scraps 24 will be automatically washed away from the chuck 10 by cutting and cleaning water. In this way, the edge scraps 24 will not hit the cutting blade(s) during cutting.

Thus using the embodiment of the invention described hereinbefore with reference to the accompanying drawings, the chuck essentially restrains the edge scraps during a cutting process. The chuck thus inter alia holds the edge scraps as well as the individual components to be separated during a cutting and singulation process.

The Invention described herein is susceptible to variations, modifications and/or additions other than those specifically described and it is to be understood that the invention includes all such variations, modifications and/or additions which fall within the spirit and scope of the above description.

What is claimed is:

1. An apparatus to singulate a plurality of components of a workpiece, the workpiece having chaff areas, the apparatus comprising:

a chuck to hold the workpiece, the chuck including a first pressure arrangement to restrain the chaff areas directly on the chuck to prevent the chaff areas from moving while the components are being singulated, the chuck further including a second pressure arrangement to hold the components of the workpiece while the components are being singulated; and a cleansing arrangement operable to remove the chaff areas from the chuck when the first pressure arrangement is deactivated and the second pressure arrangement is activated.

2. A chuck for holding a workpiece, the workpiece including a plurality of components to be singulated and chaff areas, the chuck comprising:

a workpiece receiving arrangement configured to receive the workpiece;

chaff holding means operative to hold the chaff areas of the workpiece directly on the chuck to restrain the chaff areas from moving while the components are being singulated, and respective first pressure means to hold the components and the chaff holding means comprise second pressure means to hold the chaff areas.

3. A chuck according to claim 2, including means selectively to deactivate the first and second pressure means after the components have been singulated.

4. A chuck according to claim 2, wherein the second pressure means comprise a series of suction ports to provide a pressure force on the chaff areas and restrain the chaff areas from moving while the components are being singulated.

5. A chuck according to claim 4, wherein the suction ports include respective suction ports associated with portions of the chaff areas respectively located adjacent to the components such that the portions of the chaff areas are secured when the components are singulated.

6. A chuck according to claim 4, wherein the pressure force comprises a suction pressure force resulting from the suction of air through the suction ports, which is in fluid communication with air passages leading to a vacuum source.

7. A chuck according to claim 6, wherein the air passages extend over the periphery of a group of the components to be singulated.

8. Apparatus for singulating components from a workpiece having a plurality of the components, the apparatus comprising: a chuck according to claim 3 and cleansing means, whereby upon activation of the first pressure means and deactivation of the second pressure means, the chaff areas are automatically removable from the chuck.

9. A chuck to hold a workpiece having a plurality of components to be singulated and chaff areas, the chuck comprising:

a chaff restraining arrangement to restrain the chaff areas directly on the chuck to prevent the chaff areas from moving while the components are being singulated, the chaff restraining arrangement includes a first pressure arrangement to restrain the chaff areas, the chuck further comprising a second pressure arrangement to hold the components while the components are being singulated.

10. The chuck of claim 9, further comprising a deactivation arrangement to selectively deactivate the first and second pressure arrangements after the components have been singulated.

11. The chuck of claim 9, wherein the first pressure arrangement includes a series of ports to provide a pressure force to restrain the chaff areas while the components are being singulated.

* * * * *